T. MIDGLEY.
HAMMER FOR FIXING TIRE TREADS.
APPLICATION FILED MAR. 7, 1914.
1,162,380.
Patented Nov. 30, 1915.
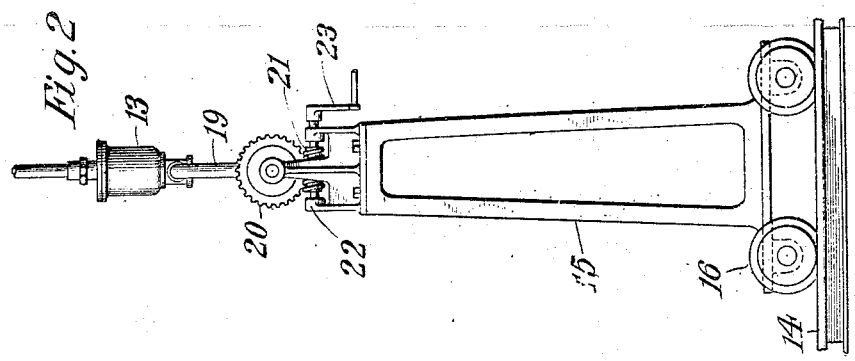
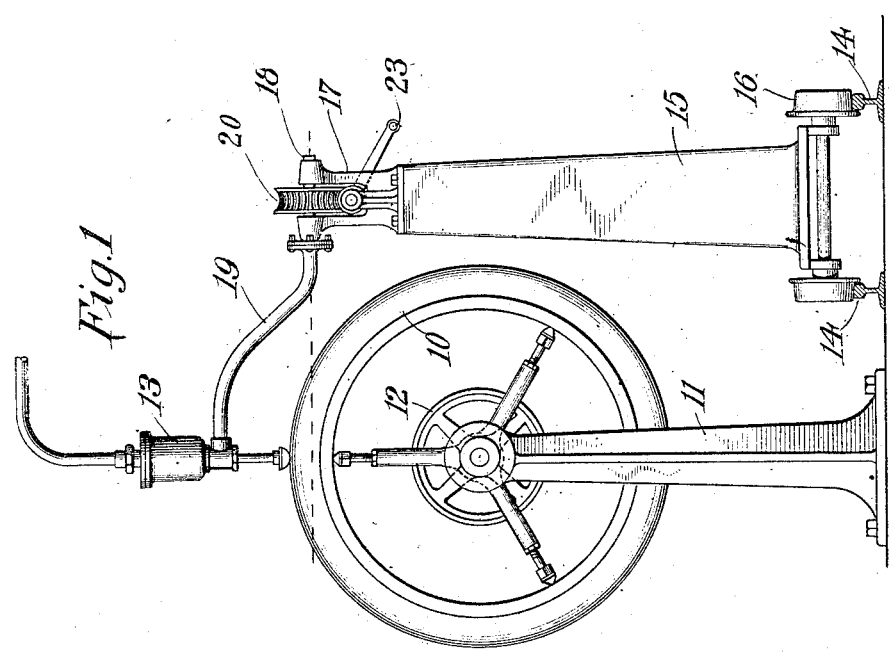
Thomas Midgley
Inventor

UNITED STATES PATENT OFFICE.

THOMAS MIDGLEY, OF WORTHINGTON, OHIO, ASSIGNOR TO MORGAN & WRIGHT, OF DETROIT, MICHIGAN, A CORPORATION OF MICHIGAN.

HAMMER FOR FIXING TIRE-TREADS.

1,162,380.

Specification of Letters Patent.    Patented Nov. 30, 1915.

Application filed March 7, 1914. Serial No. 823,154.

*To all whom it may concern:*

Be it known that I, THOMAS MIDGLEY, a citizen of the United States, residing at Worthington, county of Franklin, and State of Ohio, have invented certain new and useful Improvements in Hammers for Fixing Tire-Treads, of which the following is a full, clear, and exact description.

This invention relates to machines for securing molded semi-cured tire treads on tire carcasses.

When molded semi-cured tire treads are to be secured on tire carcasses, it is customary to support the carcass on a revoluble ring core and to position the molded semi-cured tread loosely on the outer surface of the carcass so supported. The tread being semi-cured, is somewhat resilient and does not readily conform to the contour of the carcass, so that the edges must be manually pressed down upon the sides of the carcass, which operation causes puckerings in the tread. The tread is then tapped slightly with a light hammer by hand to smooth out these puckerings and cause the tread to adhere to the carcass. During this hammering operation, the ring core is revolved until all portions of the tread are smoothly and intimately attached to the carcass. This affixing operation requires a great deal of physical exertion as well as nice judgment on the part of the operator, since only blows perpendicular or normal to the surface of the tread, and glancing blows directed radially of the tread, must be used, blows directed in a slanting direction circumferentially of the tread causing a twisting of the tread resulting in inequalities of the contour of the finished tire.

The present invention has for its object to obviate manual hammering and the inequalities in the tire incident thereto, and to attain this end, provides a power hammer so positioned as to affix the treads more expeditiously and with greater accuracy than can be done by hand, in that the hammer is confined to deliver only such blows as are essential to produce a tire devoid of imperfections.

With the above objects in view, the invention consists in certain novel details of construction and combination of parts hereinafter fully described and claimed, it being understood that various modifications may be resorted to within the scope of the appended claims.

In the accompanying drawing forming part of this specification—Figure 1 is a side elevation of the machine; Fig. 2 is a front elevation of the machine.

Referring now to the drawing, in which like characters of reference designate similar parts, 10 designates a ring core of the usual type employed in building tires, and 11 designates a support upon which the ring core is rotatably mounted for turning by hand, or power, as at 12.

In carrying out my invention, I provide a power hammer 13, which may be pneumatic, electric, or of other automatic type, which hammer I mount to operate at all times in a radial plane with respect to the ring core, the hammer further being rotatable through a fixed arc from a center which is shiftable transverse of the tire. The advantage attained by thus positioning the hammer is that the blows are positively confined to the proper direction necessary to produce a tire devoid of imperfections, that is, only blows radial in direction or perpendicular in direction or normal to the surface of the tread, will be struck, and no slanting blows in a direction circumferential of the tread can be struck as is possible with the manual hammer, even when extreme care is taken to avoid such blows.

To mount the hammer as above described, I preferably employ a track comprising rails 14, and a standard 15 is slidably supported on this track by wheels 16. A bearing 17 is fixed to the top of the standard and a shaft 18 is journaled in this bearing. The shaft terminates at the outer end in an offset arm 19 which is fixed to the body of the power hammer 13. A worm-gear 20 is fixed to the shaft and is driven from a worm-shaft 21 which is carried in bearing 22 and is operated by a crank-handle 23.

In operation the operator moves the machine along its track into the plane of the ring core. The hammer is then set in operation and the tire and its supporting core, are slowly rotated in their own plane preferably toward the hammer. By turning the crank-handle, the operator swings the hammer about a fixed arc, determined by the magnitude of the arm 19, whereby blows perpendicular or normal to the surface of the tread are struck. By shifting the standard on its track, the center of said fixed arc is shifted transversely of the tire whereby blows are struck in planes parallel to the plane of the tire. During this hammering operation, the tread will be pressed to firmly adhere to the carcass and all puckerings and the like in the tread will be stretched smoothly radially of the tire so that the finished tire will be uniform in contour and devoid of inequalities.

Having thus described my invention, what I claim and desire to protect by Letters Patent is:

1. The combination with a revoluble ring core, of a power hammer positioned to direct blows in a radial plane with respect to the core and means for swinging the hammer in an arc transverse of the core.

2. The combination with a revoluble ring core, of a power hammer positioned to direct blows in a radial plane with respect to the core, a support for the hammer shiftable transverse to the core, and means on the support for swinging the hammer in an arc transverse of the core.

3. The combination with a revoluble ring core, of an automatic hammer, disposed in a radial plane with respect to the core, and means adjustably positioning the hammer to direct blows perpendicular or normal to the surface of the core, and to direct blows in planes parallel to the plane of the core.

4. The combination with a revoluble ring core, of a support movable in a path transverse of the core, a manually operatable shaft mounted on said support, terminating in an offset arm, and a power hammer carried by said arm.

5. A machine for affixing tire treads upon tire carcasses comprising a portable support, a bearing thereon, a shaft mounted to turn in said bearing and terminating in an offset arm, an automatic hammer on said arm, and means for rotating said shaft to rock said hammer in a fixed arc concentric with the axis of said shaft.

Signed at Detroit, county of Wayne, State of Michigan, this 27th day of February, 1914.

THOMAS MIDGLEY.

Witnesses:
J. H. SWIFT,
E. A. BUSCHEWSKY.